Patented Aug. 23, 1938

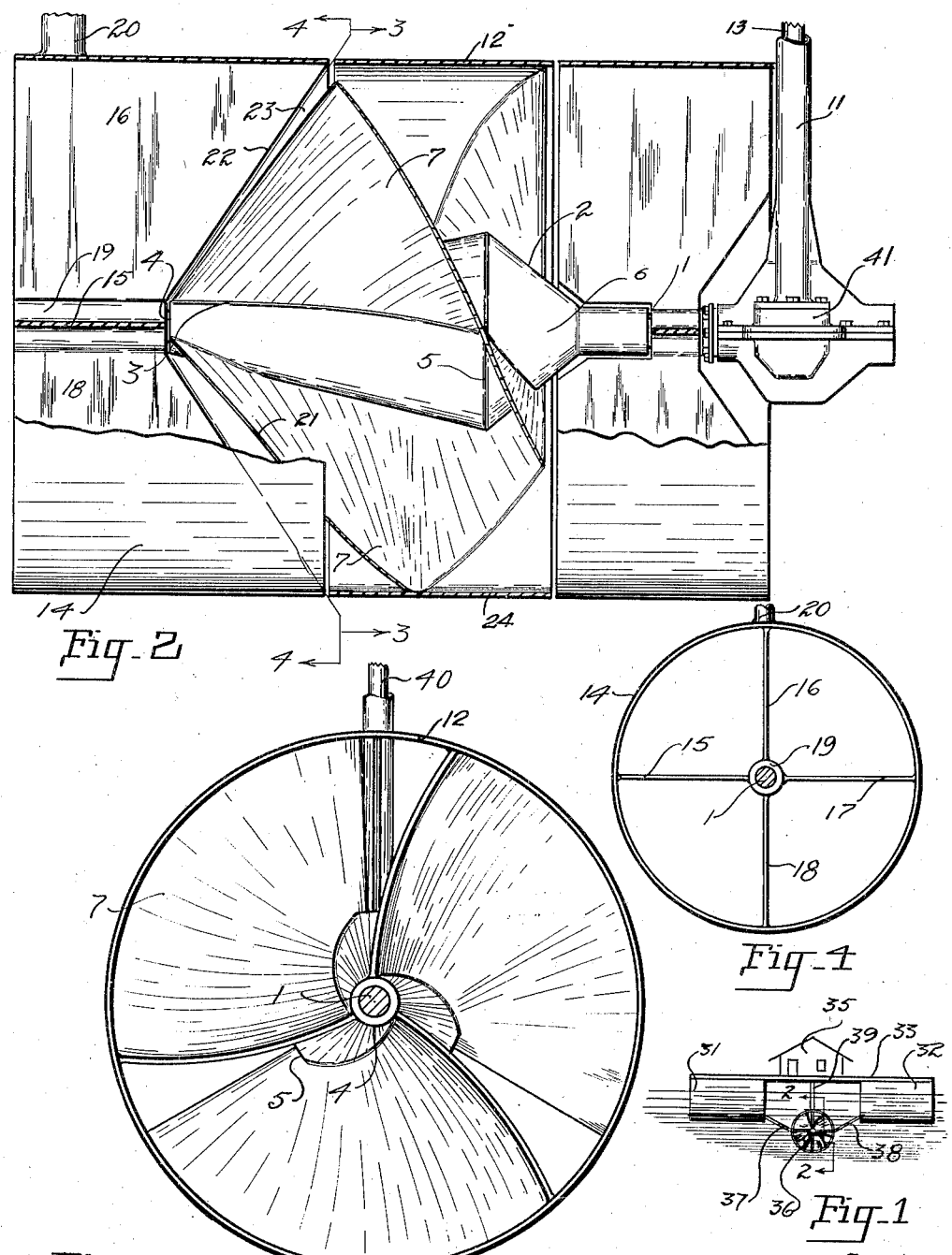

2,127,747

UNITED STATES PATENT OFFICE 2,127,747

CURRENT MOTOR

John K. Luther, Granger, Wash.

Application July 30, 1934, Serial No. 737,608

1 Claim. (Cl. 170—168)

My invention relates to current motors and the invention is comprised primarily of a longitudinal shaft upon which is mounted a central deflecting core. Screw-propeller blades outwardly extend from the core. Guide plates are placed in front of the blades to form a penstock the purpose of which is to conduct the water directly into the blades, and to develop the full operating efficiency of the water passing therethrough. Like plates are disposed at the stern or discharge end of the propeller wheel to permit the water passing without turbulence. The assembly may have a band placed therearound. In certain classes of installation the entire assembly may be suspended from fixed supports or may be suspended by pontoons. A water-tight housing is provided at one end of the shaft to facilitate the placing of co-acting gears therein that are used for transmission of the power to the point of use. The housing is preferably made water-tight in order that a lubricant may be maintained therein for eliminating a part of the friction losses of this character of construction.

The primary purpose and object of my invention consists in developing a current motor that will be of simple construction and one that may be installed in streams, in tail races, in conduits and in any and all places where it is desired to develop power for any purpose through the action of the flow of the stream of water in which the device is to be placed.

A still further object of my invention consists in so constructing the device that it may be made in various sizes to meet the requirements of the conditions where it is installed and which may be made to operate over a relatively long period with practical freedom from operating and mechanical annoyances.

And a still further object of my invention consists in constructing a current motor that may be made to operate with facility even when it is completely submerged within the stream.

With these and incidental objects in view, the invention consists in certain novel features of construction and combination of parts, the essential elements of which are set forth in the appended claims, and a preferred embodiment of which is hereinafter shown with reference to the drawing which accompanies and forms a part of this specification.

In the drawing:

Fig. 1 is an end view of one of my new and improved current motors shown in place in a stream, and shown suspended between two pontoons.

Fig. 2 is a longitudinal, sectional side view of the current motor assembly. This view is taken on line 2—2 of Fig. 1, looking in the direction indicated.

Fig. 3 is a sectional, end view of the current motor wheel and a sectional, end view of the assembly, as illustrated in Fig. 2. This view is taken on line 3—3 of Fig. 2, looking in the direction indicated.

Fig. 4 is a sectional, end view of the penstock disposed in front of the water wheel. This view is taken on line 4—4 of Fig. 2, looking in the direction indicated.

Like reference characters refer to like parts throughout the several views.

I provide a longitudinal shaft 1 and place a propeller hub 2 on the shaft. The propeller hub is formed to set up a minimum of resistance to the flow of water thereby. The leading edge 3 of the hub uniformly increases in diameter from its head 4 to its maximum diameter at 5. The leading end of the hub 2 is substantially longer than the trailing end 6 of the hub 2. I secure in any suitable manner a plurality of screw-propeller blades 7 to the hub 2. The blades are here shown as three in number, but I do not wish to be limited in the application of my device to a screw propeller having but three blades as the character and shape of the blades will depend quite largely upon the diameter of the wheel and the velocity of the current in which the wheel is to be placed. The propeller hub 2 is disposed upon the shaft and is mounted between the end of the shaft. I provide a band 12 about the wheel to prevent undue eddying and disturbing of the water passing through the wheel. A gear box with coacting gears mounted upon the respective ends of the shaft 1, and the shaft 13 and within the gear box. The shaft 13 extends longitudinally of the supporting strut 11 and transmits the power developed to any suitable apparatus to be driven. The gear box is made water-tight to permit the filling of the gear box with a lubricant in order that the co-acting gears may be lubricated and maintained in a highly efficient operating condition. Where the device is made as illustrated in Figs. 1 to 4 inclusive, a penstock is disposed in front of the wheel and the same is comprised of a cylindrical band 14, and a plurality of guide plates here shown as four in number at 15, 16, 17, and 18, the guide plates extending from the band 14 to a hub 19. In this instance the shaft 1 is made relatively longer to permit the hub 19 being secured thereupon. These guide plates may be arranged perpendicular to the axis of my device as shown. The band and guide plates are maintained in fixed position upon the shaft by any suitable strut connection 20 that secures the band and guide plates to any suitable fixed support. The leading edge of the propeller blades 7 are rearwardly inclined as illustrated at 21, and a like inclination is imparted to the rear edges of the guide plates 15 to 18 as illustrated at 22, with a space 23 being disposed between the respective propeller blade and guide plate elements. In some form of wheels the band 12 of the propeller may be eliminated and a wing-like circular ring sector 24 may be formed on the outer peripheral edge of the blade. This in effect would amount to removing the portions of the band 12 from between the trailing edge of one blade and the leading edge of the next adjacent blade. The wing portion 24 of the blade 7 has a radius equal to the maximum radius of the propeller blade.

The pipe 14 may have flanges on its opposite ends to facilitate its being placed in the pipe line when so desired.

While the form of mechanism herein shown and described is admirably adapted to fulfill the objects primarily stated, it is to be understood that it is not intended to confine the invention to the one form of embodiment herein shown and described, as it is susceptible of embodiment in various forms, all coming within the scope of the claim which follows.

What I claim is:

In a device of the class described, the combination of a shaft, a propeller hub disposed upon the shaft, such propeller hub having an enlarged head uniformly increasing in diameter from the leading end of the hub to form a frustacone and uniformly tapering from the maximum diameter of the head to form a frusto-conical trailing end, said leading end being of greater length than that of the trailing end, screw propeller blades spirally disposed about and secured to the hub, journal supports for the shaft, struts for supporting the journal supports, associated gear elements secured to the shaft to form a power take-off for the shaft, a plurality of bands disposed about the shaft, the central section of the band being secured to the outer periphery of the propeller blades and guide plates disposed in front of the propeller blades and secured to another one of the cylindrical bands.

JOHN K. LUTHER.